(12) United States Patent
Noll et al.

(10) Patent No.: US 9,383,228 B2
(45) Date of Patent: Jul. 5, 2016

(54) CONTROL VOLTAGE SIGNAL SYNTHESIS SYSTEM AND METHOD

(71) Applicant: Hamilton Sundstrand Corporation, Windsor Locks, CT (US)

(72) Inventors: Christopher Noll, Glastonbury, CT (US); Marcin Wroblewski, Unionville, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 841 days.

(21) Appl. No.: 13/692,277

(22) Filed: Dec. 3, 2012

(65) Prior Publication Data

US 2014/0156210 A1    Jun. 5, 2014

(51) Int. Cl.
*G01B 21/00* (2006.01)
*G01D 5/22* (2006.01)

(52) U.S. Cl.
CPC .................................... *G01D 5/2291* (2013.01)

(58) Field of Classification Search
CPC ........................................................ G01B 21/00
USPC ............................................................ 73/1.79
See application file for complete search history.

(56) References Cited

U.S. PATENT DOCUMENTS 6,198,296 B1    3/2001  Ivanov 7,520,572 B2    4/2009  Hatipoglu et al.
(Continued)

FOREIGN PATENT DOCUMENTS

| CN | 101769709 A | 7/2010 |
|---|---|---|
| EP | 1132718 A1 | 9/2001 |
| EP | 1462769 A2 | 9/2004 |

OTHER PUBLICATIONS

United Kingdom Search Report for United Kingdom Patent Application No. 1320279.1 completed on Jul. 6, 2014.

*Primary Examiner* — Eric S McCall
(74) *Attorney, Agent, or Firm* — Carlson, Gaskey & Olds, PC

(57) ABSTRACT

Multiple positions within a mechanical system are measured with a plurality of sensors including at least one 4-wire and at least one 5-wire sensor. The 5-wire sensor has two output voltage signals sent to a signal conversion processor, and the 4-wire sensor also sends a signal. A sum is created of the two voltage signals from the 5-wire sensor. An excitation voltage supply supplies a common excitation voltage to both sensors. Feedback of the excitation voltage is measured by the signal conversion processor. The excitation voltage feedback is utilized to ratio-metrically correct a position feedback signal from the 4-wire sensor at the signal conversion processor. The signal conversion processor is able to synthesize a signal indicative of the excitation voltage from the two voltage signals sent from the 5-wire sensor in the event the excitation voltage feedback is not received at the signal conversion processor.

14 Claims, 1 Drawing Sheet

(56) References Cited

U.S. PATENT DOCUMENTS

| | | |
|---|---|---|
| 7,736,269 B2 | 6/2010 | Long et al. |
| 7,921,826 B2 | 4/2011 | Kobayashi et al. |
| 7,946,557 B2 | 5/2011 | Chirico |
| 8,070,094 B2 | 12/2011 | Collins |
| 8,109,165 B2 | 2/2012 | Himmelmann |
| 8,128,059 B2 | 3/2012 | Uechi et al. |
| 8,133,027 B2 | 3/2012 | Carvalho et al. |
| 8,145,400 B2 | 3/2012 | Kusej et al. |
| 8,262,531 B2 | 9/2012 | Himmelmann et al. |
| 2007/0146942 A1* | 6/2007 | Covington ............... G01D 3/08 361/38 |
| 2008/0039996 A1 | 2/2008 | Lee |
| 2012/0139531 A1* | 6/2012 | Villano ............... G01D 5/2291 324/207.18 |
| 2012/0290238 A1 | 11/2012 | Nair et al. |

* cited by examiner

CONTROL VOLTAGE SIGNAL SYNTHESIS SYSTEM AND METHOD

BACKGROUND OF THE INVENTION

This application relates to a method of synthesising a feedback signal of an excitation voltage for a sensor.

Control systems are becoming increasingly complex when utilized with modern mechanical systems. In one type of control system, there are a plurality of sensors sensing the position of various components within a mechanical system. As an example, one type sensor may monitor a linear position of an actuator driving a mechanical component. A second sensor may sense a position of a valve for providing hydraulic fluid to drive the actuator.

There are many types of sensors available. It is known to have simpler sensors and more complex sensors. There are relatively complex sensors known as 5-wire Linear Variable Differential Transformer (LVDT) and Rotary Variable Differential Transformer (RVDT) sensors, which may be utilized for more critical sensing applications. These 5-wire LVDT and RVDT sensors have enhanced feedback of the reliability of their sensing. As an example, they have increased validity due to a constant sum check. There is no need to monitor the voltage excitation sent to a 5-wire sensor, as the sensed position can be determined based solely on the sensor outputs making the reliability and accuracy of the position measurement independent of the exact value of the excitation input to the sensor. However, the 5-wire sensors are relatively expensive and large, and require greater computing power at a related control.

On the other hand, there are less sophisticated sensors known as 4-wire Linear Variable Differential Transformer (LVDT) and Rotary Variable Differential Transformer (RVDT) sensors. These do not provide a sum check, and the feedback provided by such sensors typically needs to be adjusted ratio-metrically such that a sensor excitation based weighting factor can be applied to the sensed position feedback. On the other hand, the 4-wire LVDT and RVDT devices are relatively small and inexpensive compared to the 5-wire devices.

The 4-wire LVDT and RVDT devices require feedback of an excitation voltage to determine the weighting factor, and in the past if that feedback has failed, the 4-wire sensor could not be determined to be accurate or reliable.

SUMMARY OF THE INVENTION

A mechanical system has a movable mechanical component that requires measurement of the position of that mechanical component. In certain applications, multiple positions within the system are measured with a plurality of sensors. The plurality of sensors may include at least one 4-wire and at least one 5-wire sensor. The 5-wire sensor has two output voltage signals sent to a signal conversion processor, and the 4-wire sensor also sends a signal to the signal conversion processor. The signal conversion processor creates a sum of the two voltage signals from the 5-wire sensor. An excitation voltage supply supplies a common excitation voltage to both the 4-wire sensor and the 5-wire sensor. Feedback of the excitation voltage is measured by the signal conversion processor. The excitation voltage feedback is utilized to ratio-metrically correct a feedback signal from the 4-wire sensor at the signal conversion processor. The signal conversion processor is able to synthesize a signal of the excitation voltage from the two voltage signals sent from the 5-wire sensor in the event the excitation voltage feedback is not received at the signal conversion processor.

These and other features may be best understood from the following drawings and specification.

DETAILED DESCRIPTION

Figure 1:
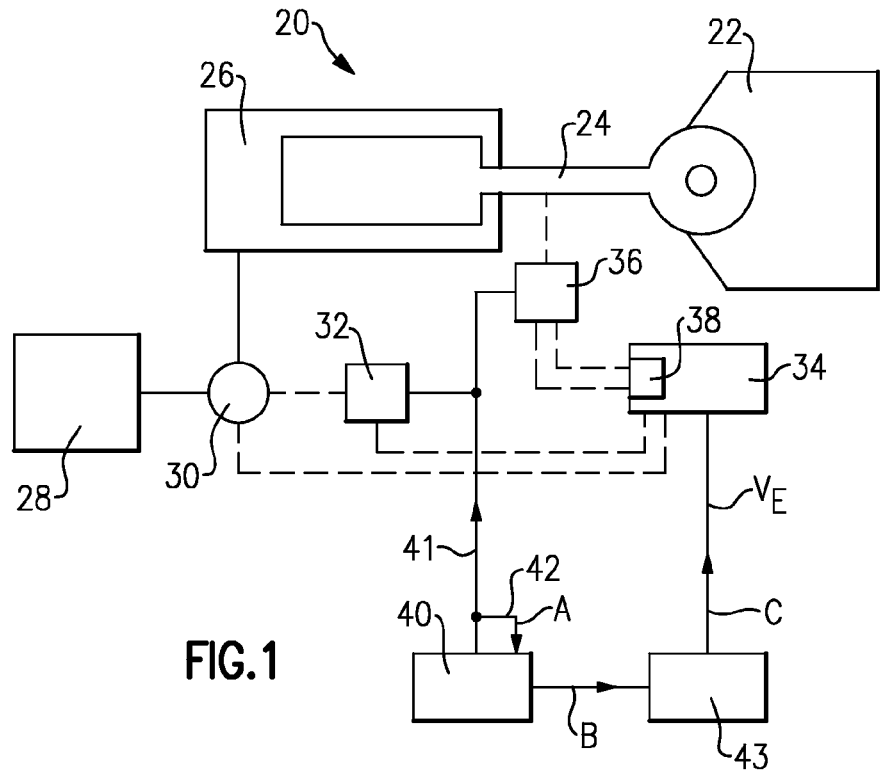
FIG. 1 schematically shows a mechanical system.

FIG. 1 shows a mechanical system 20 for moving a component 22. Component 22 may be any number of mechanical components and in some applications could be a component on an aircraft.

A piston 24 from an actuator cylinder 26 is driven to change the location, or orientation, of the component 22. As known, hydraulic source 28 drives hydraulic fluid through a valve 30 into the cylinder 26 to move the piston 24.

A 4-wire sensor 32 senses the position of the valve 30, and provides feedback to an input/output processor 34. A 5-wire sensor 36 senses a linear position of the piston 24, and provides two lines of feedback with two distinct voltages to the controller/processor 34. The controller 34 takes a sum of the two voltage signals at 38. The 4-wire sensor 32 and the 5-wire sensor 36 may both be Linear Variable Differential Transformer sensors (LVDT) or Rotary Variable Differential Transformer sensors (RVDT). In addition, the teachings of this application would extend to systems having more than one 4-wire sensor 32 and more than one 5-wire sensor 36, and to systems for controlling mechanical items other than the piston 24, actuator cylinder 26, and valve 30.

The processor 34 controls the valve 30 to adjust the position of the component 22 by controlling the flow and pressure of hydraulic fluid to the cylinder 26.

A supply 40 sends an excitation voltage on line 41 to both sensors 32 and 36. That is, an excitation voltage is common to the two sensors 32 and 36.

Feedback of the excitation voltage at 42 is captured at the supply 40. From the supply 40 the feedback passes to a main controller 43 and from the main controller 43 back to the input/output processor 34.

The feedback signal 42 is utilized to ratio-metrically correct the signal sent from the sensor 32 to the input/output processor 34. That is, dependent on the magnitude of $V_E$, the signal from the 4-wire sensor 32 may not be accurate. Instead, it is known to provide an adjustment, or weighting factor, based upon the magnitude of $V_E$ to the signal from the 4-wire sensor 32. In this sense, processor 34 may be called a signal conversion processor.

The above is as known in the art, and a worker of ordinary skill in the art would recognize when and how to apply the various features above.

One challenge with the above system 20 is that the feedback signal 42 is necessary to properly evaluate the feedback signal (the position signal, for example) from the 4-wire sensor 32 being used at the input/output processor 34. At points A, B, and C this feedback signal 142 can fail. Without the feedback signal 42, the input/output processor 34 cannot properly utilize the feedback signal from the 4-wire sensor 32, as it is not able to ratio-metrically correct the signal. Ratio-metric correction is the mathematical process of weighting sensor output such that position sensing accuracy is maintained regardless of sensor excitation voltage accuracy.

Applicant has recognized that the common wire 41 supplies the same excitation voltage to both the sensors 32 and 36, and the signal from sensor 36 is accurate as received at the input/output processor 34. The sum at 38 includes a factor based upon the excitation voltage. Thus, Applicant programs the input/output processor 34 to take the sum at 38, and utilize the following formula:

$$K = \text{sum}/V_E$$

The capital K can be an estimate for the particular 5-wire sensor 36 that would be known, or could be determined experimentally.

As one example, at startup of the system when the processor 34 is still receiving valid feedback signals from the main controller 43, the processor 34 may calculate the K as it knows the accurate excitation voltage at that point.

Figure 2:
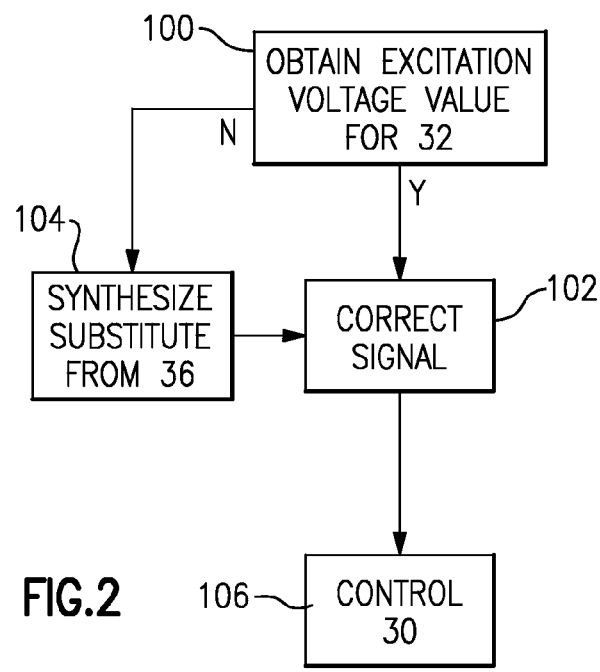
FIG. 2 is a flow chart of a method according to this application.

FIG. 2 is a flow chart. At step 100, the input/output processor 34 asks whether it is obtaining a feedback signal. If it does, it corrects 102 the signal ratio metrically and controls 106 the valve 30 as required. However, if it is not obtaining a feedback signal, it calculates a substitute from the sum 38 at step 104, and utilizes that calculated or synthesized signal indicative of the excitation voltage ($V_E$) to correct the signal at step 102. Again, control of the valve 30 then occurs at step 106.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
    a mechanical system having multiple elements requiring position sensing via a plurality of position sensors;
    at least one 4-wire sensor for sensing a position of at least one element;
    a 5-wire sensor for sensing a position of at least one element;
    said 5-wire sensor having two output voltage signals being sent to a signal conversion processor, and said 4-wire sensor sending a signal to said signal conversion processor, said signal conversion processor creating a sum of said two voltage signals from said 5-wire sensor;
    an excitation voltage supply for supplying a common excitation voltage to both said 4-wire sensor and said 5-wire sensor, and there being feedback of said excitation voltage being monitored by said signal conversion processor, said excitation voltage feedback being utilized to ratio-metrically correct a position feedback signal from said 4-wire sensor at said signal conversion processor; and
    said signal conversion processor being able to synthesize a signal indicative of the excitation voltage from said two voltage signals sent from said 5-wire sensor in the event said excitation voltage feedback is not received at said signal conversion processor.

2. The system as set forth in claim 1, wherein said excitation voltage feedback is taken at a supply for said excitation voltage, sent through a main controller, and then to said signal conversion processor.

3. The system as set forth in claim 1, wherein said signal conversion processor is an input/output processor.

4. The system as set forth in claim 1, wherein said signal conversion processor takes a sum of said two voltages from said 5-wire sensor and utilizes the following formula:

$$K = \text{sum}/V_E$$

synthesize the excitation voltage signal ($V_E$) by estimating a constant K for the 5-wire sensor.

5. The system as set forth in claim 1, wherein said signal conversion processor calculates a value of K by utilizing an excitation voltage feedback signal while it is still being received to determine the $V_E$ factor in the above formula.

6. The system as set forth in claim 1, wherein said at least one 4-wire sensor and said 5-wire sensor are one of Linear Variable Differential Transformer sensors or Rotary Variable Differential Transformer sensors.

7. The system as set forth in claim 1, wherein said multiple elements include a piston to be driven inwardly and outwardly of a hydraulic cylinder, and a valve for controlling a flow of hydraulic fluid to said cylinder.

8. The system as set forth in claim 7, wherein at least one 4-wire sensor senses a position of said valve, and said at least one 5-wire sensor senses a position of said piston.

9. A system comprising:
    a component to be moved by an actuator;
    an actuator, said actuator having a piston to be driven inwardly and outwardly of a hydraulic cylinder;
    a valve for controlling a flow of hydraulic fluid to said cylinder;
    at least one 4-wire sensor for sensing a position of said valve;
    at least one 5-wire sensor for sensing a position of said actuator, said 5-wire sensor having two output voltage signals being sent to a signal conversion processor, and said 4-wire sensor sending a signal to said signal conversion processor, said signal conversion processor creating a sum of said two voltage signals from said 5-wire sensor, and said signal conversion processor controlling said valve to control the hydraulic fluid delivered to said cylinder;
    an excitation voltage supply for supplying a common excitation voltage to both said 4-wire sensor and said 5-wire sensor, and there being feedback of said excitation voltage taken remotely from said signal conversion processor and sent to said signal conversion processor, said excitation voltage feedback being utilized to ratio-metrically correct a position feedback signal from said 4-wire sensor at said signal conversion processor; and
    said signal conversion processor being able to synthesize a signal indicative of the excitation voltage from said two voltage signals sent from said 5-wire sensor in the event said excitation voltage feedback is not received at said signal conversion processor.

10. The system as set forth in claim 9, wherein excitation voltage feedback is taken at a supply for said excitation voltage, sent through a main controller, and then to said signal conversion processor.

11. The system as set forth in claim 9, wherein said signal conversion processor is an input/output processor.

12. The system as set forth in claim 9, wherein said signal conversion processor takes a sum of said two voltages from said 5-wire sensor and utilizes the following formula:

$$K = \text{sum}/V_E$$

to synthesize the excitation voltage signal ($V_E$) by estimating a constant K for the 5-wire sensor.

13. The system as set forth in claim 12, wherein said signal conversion processor calculates a value of K by utilizing an excitation voltage feedback signal while it is still being received to determine the $V_E$ factor in the above formula.

14. The system as set forth in claim 9, wherein said at least one 4-wire sensor and said 5-wire sensor are one of Linear Variable Differential Transformer sensors or Rotary Variable Differential Transformer sensors.

\* \* \* \* \*